United States Patent
Lin et al.

(10) Patent No.: US 11,205,241 B2
(45) Date of Patent: Dec. 21, 2021

(54) METHOD AND SYSTEM FOR LAYERED REAL-TIME GRAPHICS DRAWING AND RENDERING

(71) Applicant: ZHENGZHOU YUNHAI INFORMATION TECHNOLOGY CO., LTD., Henan (CN)

(72) Inventors: Suhong Lin, Henan (CN); Meng Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 16/981,712

(22) PCT Filed: Oct. 26, 2018

(86) PCT No.: PCT/CN2018/112060
§ 371 (c)(1),
(2) Date: Sep. 17, 2020

(87) PCT Pub. No.: WO2019/192165
PCT Pub. Date: Oct. 10, 2019

(65) Prior Publication Data
US 2021/0035256 A1  Feb. 4, 2021

(30) Foreign Application Priority Data
Apr. 2, 2018 (CN) .......................... 201810281958.0

(51) Int. Cl.
*G06T 1/20* (2006.01)
*G06T 7/11* (2017.01)
(Continued)

(52) U.S. Cl.
CPC .................. *G06T 1/20* (2013.01); *G06T 7/11* (2017.01); *G06T 7/174* (2017.01); *G06T 15/005* (2013.01);
(Continued)

(58) Field of Classification Search
None
See application file for complete search history.

(56) References Cited

U.S. PATENT DOCUMENTS 6,898,313 B2    5/2005  Xin et al.
2009/0259653 A1*  10/2009  Obana .................... G06F 16/70
(Continued)

FOREIGN PATENT DOCUMENTS

CN      101488233 A    7/2009
CN      102385759 A    3/2012
(Continued)

OTHER PUBLICATIONS

International Search Report for PCT/CN2018/112060 dated Jan. 18, 2019, ISA/CN.

*Primary Examiner* — Frank S Chen
(74) *Attorney, Agent, or Firm* — Yue (Robert) Xu; Apex Attorneys at Law, LLP

(57) ABSTRACT

A method and system for drawing and rendering a graphic in real-time in a layered manner are provided. Adjacent application frames spaced with a time period are extracted, a scene change rate is calculated, and whether the scene change rate exceeds a preset change rate threshold is determined. If the scene change rate does not exceed the preset change rate threshold, graphic elements are grouped to a same graphic layer. If the scene change rate exceeds the preset change rate threshold, M application frames chronologically located between the adjacent application frames are extracted. Each application frame is divided into N (Continued)

regions, and a scene change rate of adjacent application frames is calculated for each region. An average scene change rate for each region is calculated, a layering operation is performed based on the average scene change rate, and graphic layers are drew and rendered separately.

12 Claims, 3 Drawing Sheets

(51) Int. Cl.
  *G06T 7/174* (2017.01)
  *G06T 15/00* (2011.01)
  *G06T 17/05* (2011.01)

(52) U.S. Cl.
  CPC .... *G06T 17/05* (2013.01); *G06T 2207/20021* (2013.01); *G06T 2207/20221* (2013.01); *G06T 2207/20224* (2013.01)

(56) References Cited

U.S. PATENT DOCUMENTS

2017/0287097 A1* 10/2017 Chen ................ G06T 19/006
2018/0021000 A1*  1/2018 Akiyama ............ A61B 6/481
                                                    378/62

FOREIGN PATENT DOCUMENTS

| CN | 102737097 A | 10/2012 |
| CN | 103400353 A | 11/2013 |
| CN | 108549581 A |  9/2018 |

* cited by examiner

METHOD AND SYSTEM FOR LAYERED REAL-TIME GRAPHICS DRAWING AND RENDERING

The present application is the national phase of International Patent Application No. PCT/CN2018/112060, titled "METHOD AND SYSTEM FOR LAYERED REAL-TIME GRAPHICS DRAWING AND RENDERING", filed on Oct. 26, 2018, which claims the priority to Chinese Patent Application No.201810281958.0, titled "METHOD AND SYSTEM FOR LAYERED REAL-TIME GRAPHICS DRAWING AND RENDERING", filed on Apr. 2, 2018 with the National Intellectual Property Administration, PRC, both of which are incorporated herein by reference in their entireties.

TECHNICAL FIELD

The present disclosure relates to the field of graphic drawing and rendering, and in particular to a method and system for drawing and rendering a graphic in real-time in a layered manner.

BACKGROUND

In the field of real-time drawing and rendering of graphics, it is required to draw and render a graphic with a high speed and to present the graphics fully and completely. However, due to graphic distortion and a small graphic rendering and refreshing speed, and with an increasingly development of hardware configurations of terminal devices, a great challenge is imposed to the field of real-time drawing and rendering of graphics while providing users with intuitive experiences. This is because that the effect of drawing and rendering directly determines the quality of both hardware products and software products. In recent years, various methods for real-time drawing and rendering of graphics are provided for different applications. The main method for real-time drawing and rendering of graphics is performed based on graphic processing algorithms at a software level and upgrade of terminal devices at a hardware level. With the development of various complex graphic processing algorithms and the improvement of hardware, the function of various terminal devices in real-time drawing and rendering of graphics are greatly improved.

In the method based on the graphic processing algorithms at the software level, the whole graphic drawing algorithm is improved, to draw the graphic on one screen efficiently and render the drew graphic, so as to present the final graphic to the user. In the method based on the update of terminal devices at the hardware level, hardware of a terminal display device is updated, which includes a GPU for graphics display and a CPU for graphics calculation. In addition, if computer performance is to be improved, it is required to update the memory. However, no matter at the software level or at the hardware level, there is no method for drawing and rendering graphics by grouping different graphic elements to different graphic layers.

However, no matter for complex computing algorithms or improvement of hardware, a high investment cost is usually required in hardware, such as CPU and GPU. This is because that it is difficult to perform real-time drawing and rendering of graphics efficiently by using the existing hardware resources, thus effect of the real-time drawing and rendering of graphics can not be improved by unlimitedly updating the hardware. Therefore, an important research direction in the field of real-time drawing and rendering of graphics is how to draw and render a graphic dynamically in a layered manner by using the existing hardware resources.

SUMMARY

According to the present disclosure, a method and system for drawing and rendering a graphic in real-time in a layered manner are provided, to solve the problem in the conventional technology that the graphic drawing and rendering method is performed mainly relying on the hardware of terminal devices, to effectively utilize the computing resources, thereby avoiding the waste the computing resources, thus drawing and rendering a graphic efficiently.

To achieve the above technical objectives, a method for drawing and rendering a graphic in real-time in a layered manner is provided according to the present disclosure. The method includes:

step S101, extracting adjacent application frames spaced with a time period, calculating a scene change rate, and determining whether the scene change rate exceeds a preset change rate threshold;

step S102, grouping, if the scene change rate does not exceed the preset change rate threshold, all graphic elements to a same graphic layer; and performing step S103 if the scene change rate exceeds the preset change rate threshold;

step S103, extracting M application frames chronologically located between the adjacent application frames;

step S104, dividing each of all the extracted application frames into N regions, and calculating a scene change rate of adjacent application frames for each of the N regions; and step S105, calculating an average scene change rate for each of the N regions, performing a layering operation based on the average scene change rate, and drawing and rendering each of graphic layers separately.

In an embodiment, the performing a layering operation based on the average scene change rate includes:

step S201, acquiring a maximum average scene change rate $S_{max}$ and a minimum average scene change rate $S_{min}$, and calculating a segmentation difference according to an expression of $$\frac{S_{max} - S_{min}}{N};$$

step S202, determining a segmentation interval for the average scene change rate based on the segmentation difference, that is:

$$\left\{ S_{min}, S_{min} + \frac{S_{max} - S_{min}}{N} * 1, \right.$$
$$\left. S_{min} + \frac{S_{max} - S_{min}}{N} * 2, \ldots, S_{min} + \frac{S_{max} - S_{min}}{N} * i, \; i = N \right\}$$

step S203, merging regions with average scene change rates that are within a same interval, and grouping the regions with average scene change rates that are within the same interval to a same graphic layer, to perform the layering operation.

In an embodiment, the average scene change rate for each of the N regions is calculated according to the following expression:

$$S_{average} = \frac{\sum_{j}^{M} S_j}{M-1}, \quad j = 1, 2, \ldots, M$$

where $S_{average}$ represents the average scene change rate, and $S_j$ represents a scene change rate of a (j+1)-th application frame relative to a j-th application frame.

In an embodiment, the N regions have a same area.

A system for drawing and rendering a graphic in real-time in a layered manner is further provided according to the present disclosure. The system includes: a primary application frame extracting module, a change rate comparing module, a secondary application frame extracting module, a region scene change rate module, and a layering module.

The primary application frame extracting module is configured to extract adjacent application frames spaced with a time period, calculate a scene change rate, and determine whether the scene change rate exceeds a preset change rate threshold.

The change rate comparing module is configured to group, if the scene change rate does not exceed the preset change rate threshold, all graphic elements to a same graphic layer, and perform step S3 if the scene change rate exceeds the preset change rate threshold.

The secondary application frame extracting module configured to extract M application frames chronologically located between the adjacent application frames.

The region scene change rate module configured to divide each of all the extracted application frames into N regions, and calculate a scene change rate of adjacent application frames for each of the N regions.

The layering module configured to calculate an average scene change rate for each of the N regions, perform a layering operation based on the average scene change rate, and draw and render each of graphic layers separately.

In an embodiment, the layering module includes a segmentation difference calculating unit, a segmentation interval determining unit, and a region merging unit.

The segmentation difference calculating unit is configured to acquire a maximum average scene change rate $S_{max}$ and a minimum average scene change rate $S_{min}$, and calculate a segmentation difference according to an expression of $$\frac{S_{max} - S_{min}}{N}.$$

The segmentation interval determining unit is configured to determine a segmentation interval for the average scene change rate based on the segmentation difference, that is:

$$\left\{ S_{min}, S_{min} + \frac{S_{max} - S_{min}}{N} * 1, \right.$$

$$\left. S_{min} + \frac{S_{max} - S_{min}}{N} * 2, \ldots, S_{min} + \frac{S_{max} - S_{min}}{N} * i, i = N \right\}$$

The region merging unit is configured to merge regions with average scene change rates that are within a same interval, and group the regions with average scene change rates that are within the same interval to a same graphic layer, to perform the layering operation.

In an embodiment, the average scene change rate for each of the N regions is calculated according to the following expression:

$$S_{average} = \frac{\sum_{j}^{M} S_j}{M-1}, \quad j = 1, 2, \ldots, M$$

where $S_{average}$ represents the average scene change rate, and $S_j$ represents a scene change rate of a (j+1)-th application frame relative to a j-th application frame.

In an embodiment, the N regions have a same area.

The effects described in the present disclosure are only the effects of the embodiments, rather than all the effects of the present disclosure. Any one of the above technical solutions can realize the following advantages or beneficial effects.

Compare with the conventional technology, in the present disclosure, display graphic layers are established based on the acquired change rates of graphic elements, the entire graphic is processed in a layered manner. The graphic layers are drawn and rendered separately according to requirements for different graphics, thereby solving the problem in the conventional technology that the graphic drawing and rendering method is performed mainly relying on the hardware of terminal devices. By processing the graphic in a layered manner, a limited computing resources of the computer are allocated to graphic layers including graphic elements with high change rates, so that the waste of the computing resources can be avoided, and the graphics drawing and rendering method can be performed efficiently. The technical solutions of the present disclosure are applicable to the fields of large-scale geographic graphics drawing, dynamic communication signal maps drawing, dynamic map condition changing, real-time data monitoring, and the like.

BRIEF DESCRIPTION OF THE DRAWINGS

In order to more clearly describe the technical solution in the embodiments of the present disclosure or the technical solutions in the conventional art, drawings to be used in the description of the embodiments of the present disclosure or the conventional art are briefly described hereinafter. It is apparent that the drawings described below show merely the embodiments of the present disclosure, and those skilled in the art may obtain other drawings according to the provided drawings without any creative effort.

DETAILED DESCRIPTION OF THE EMBODIMENTS

Figure 1:
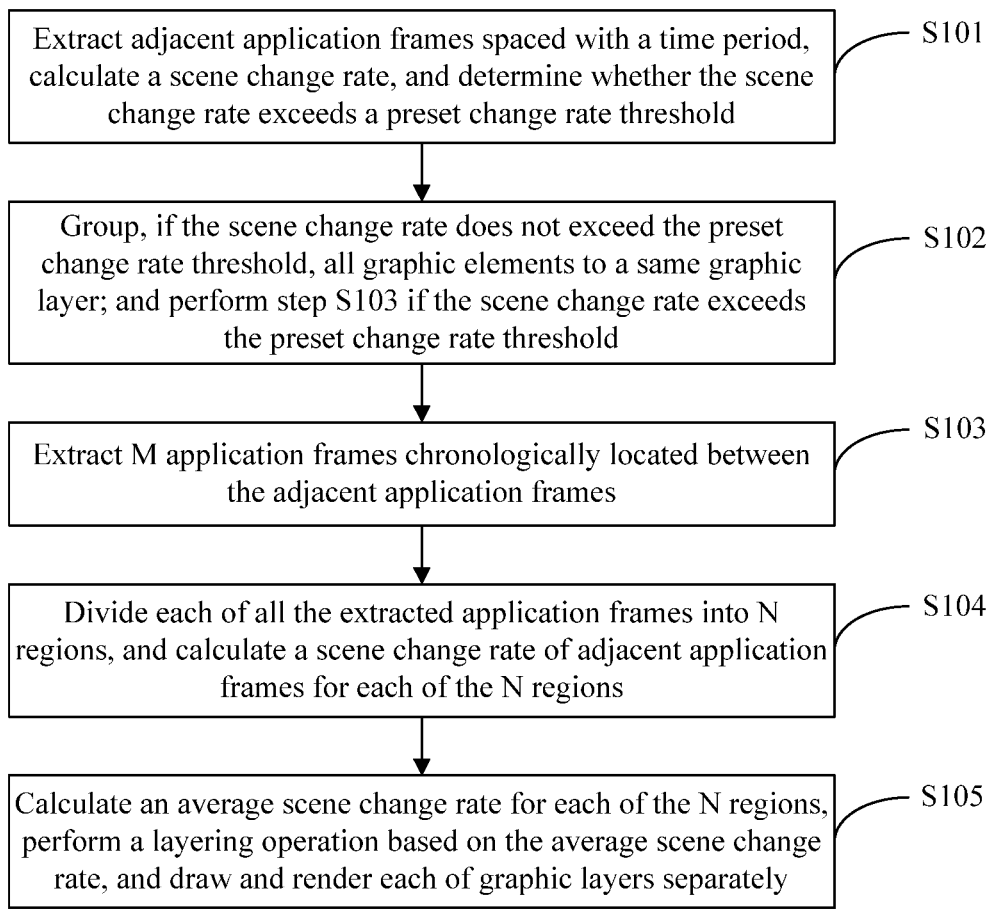
FIG. 1 is a flow chart of a method for drawing and rendering a graphic in real-time in a layered manner according to an embodiment of the present disclosure.

In order to clearly explain the technical characteristics of the present disclosure, the present disclosure are described in detail below in conjunction with embodiments and the drawings in the embodiments. Multiple different embodiments or examples are provided for implementing different structures of the present disclosure. To simplify the present disclosure, the components and settings in specific embodiments are described below. In addition, reference numerals and/or letters may be used repeatedly in different embodiments. This repetition is for simplicity and clarity, and does not indicate the relationship between the described embodiments and/or settings. It should be noted that the components illustrated in the drawings are not necessarily drawn to scale. Descriptions of well-known components and processing techniques and processes are omitted in the present disclosure to avoid unnecessary limitation to the present disclosure.

A method and system for drawing and rendering a graphic in real-time in a layered manner according to the present disclosure are described in conjunction with the drawings.

As shown in FIG. 1, a method for drawing and rendering a graphic in real-time in a layered manner is provided according to an embodiment of the present disclosure. The method includes the following steps S101 to S105.

In step S101, adjacent application frames spaced with a time period are extracted, a scene change rate is calculated, and it is determined whether the scene change rate exceeds a preset change rate threshold.

In step S102, if the scene change rate does not exceed the preset change rate threshold, all graphic elements are grouped to a same graphic layer; and if the scene change rate exceeds the preset change rate threshold, step S103 is performed.

In step S103, multiple application frames chronologically located between the adjacent application frames are extracted.

In step S104, each of all the extracted application frames is divided into N regions, and a scene change rate of adjacent application frames is calculated for each of the N regions.

In step S105, an average scene change rate is calculated for each of the N regions, a layering operation is performed based on the average scene change rate, and each of graphic layers is drawn and rendered separately.

A displayed graphic may include multiple different graphic elements, and each of the graphic elements may change with a certain frequency. If the entire graphic is drawn and rendered, a large amount of computing resources may be wasted, resulting in freeze and distortion of the graphic. A speed of drawing and rendering a graphic is directly affected by model sizes, material parameters, texture complexity, lighting parameters, and change rates of different graphic elements. Since there is a high requirement on the change rate of the graphic elements in the real-time drawing and rendering of graphics, the graphic elements of the graphic are grouped to different graphic layers based on the change rates of the graphic elements, and the graphic elements are processed in a layered manner. In this way, the graphic layers are drawn and rendered according to requirements for different graphics separately, thereby avoiding a waste in time and resources in repeatedly drawing and rendering unchanged graphic elements. For example, in a three-dimensional geographic information system, a geographic surface part which has a low change rate and is drawn and rendered complicatedly may be arranged at a graphic layer, and above-ground elements which have high change rates may be grouped to other graphic layers. It is unnecessary to draw and render the graphic layer of the geographic surface part repeatedly with the changes of other graphic elements.

Adjacent application frames spaced with a certain time period are extracted, and are referred to as a start frame and an end frame. A scene change rate of the end frame relative to the start frame is calculated, and it is determined whether the scene change rate exceeds a preset change rate threshold.

The scene change rate is calculated as follows.

N pixel points in the start frame are randomly selected. $X_{t-1}(i)$ represents an i-th pixel point in the start frame, and $X_t(i)$ represents an i-th pixel point in the end frame. A difference between the two pixel points is calculated according to the following expression:

$$D_o(X_t, X_{t-1}) = \sqrt{(x_t^R - x_{t-1}^R)^2 + (x_t^G - x_{t-1}^G)^2 + (x_t^B - x_{t-1}^B)^2}$$

A threshold $D_T$ is set for a difference between the pixel points, which is generally set based on experiences. The difference $D_o(X_t, X_{t-1})$ between the end frame and the start frame for each of the randomly selected N pixel points is compared with $D_T$, and the number of pixel points with large differences are counted. The scene change rate $\lambda$ is calculated as follows:

$$I_t(i) = \begin{cases} 1 & D_o(X_t(i), X_{t-1}(i)) \geq D_T \\ 0 & D_o(X_t(i), X_{t-1}(i)) < D_T \end{cases}$$

$$\lambda(t) = \frac{\sum_{i=1}^{N} I_t(i)}{N}$$

If the scene change rate does not exceed the threshold, all graphic elements are grouped to a same graphic layer; and if the scene change rate exceeds the threshold, the following operation is performed.

Multiple application frames are further extracted, which are chronologically located between the start frame and the end frame. That is, the number of all the extracted application frames is greater than two, so that the regions including changed graphic elements can be acquired accurately.

Each of all the extracted application frames is divided into N regions having the same area, a scene change rate of adjacent application frames is acquired for each of the N regions, and an average scene change rate for each of the N regions is calculated based on the scene change rate of adjacent application frames.

The average scene change rate for each of the N regions is calculated as follows:

$$S_{average} = \frac{\sum_{j}^{M} S_j}{M - 1}, j = 1, 2, \ldots, M$$

where $S_{average}$ represents the average scene change rate, and $S_j$ represents a scene change rate of a (j+1)-th application frame relative to a j-th application frame.

Finally, a layering operation is performed based on the average scene change rate, which includes the following steps S201 to S203.

In step S201, a maximum average scene change rate $S_{max}$ and a minimum average scene change rate $S_{min}$ are acquired, and a segmentation difference is calculated according to an expression of $$\frac{S_{max} - S_{min}}{N}.$$

In step S202, a segmentation interval for the average scene change rate is determined based on the segmentation difference, that is:

$$\left\{ S_{min}, S_{min} + \frac{S_{max} - S_{min}}{N} * 1, \right.$$
$$\left. S_{min} + \frac{S_{max} - S_{min}}{N} * 2, \ldots, S_{min} + \frac{S_{max} - S_{min}}{N} * i, i = N \right\}$$

In step S203, regions with average scene change rates that are within a same interval are merged, and the regions with average scene change rates that are within the same interval are grouped to a same graphic layer, to perform the layering operation. In addition, the graphic is processed in a layered manner according to requirements. For example, for a graphic region with a lowest average scene change rate, the refreshing operation is not performed while a frame rate is increased, so that different graphic layers are drawn and rendered according to requirements for different graphics.

Figure 2:
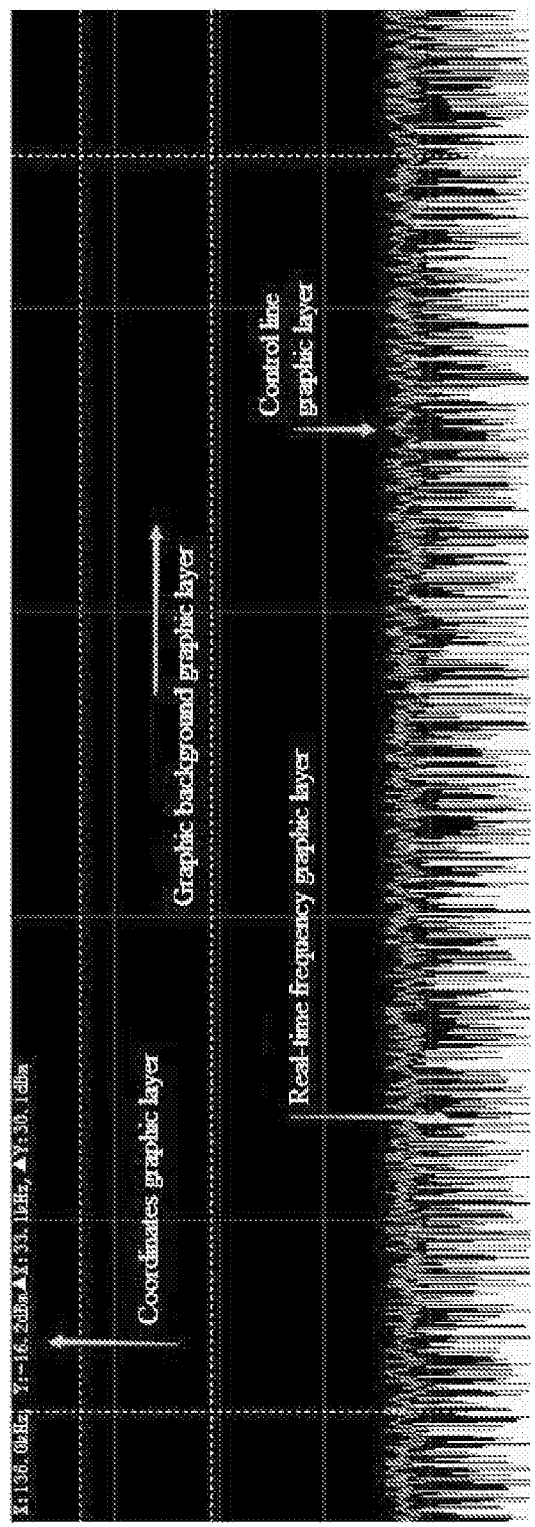
FIG. 2 is a spectrum view of a communication signal according to an embodiment of the present disclosure.

Taking a spectrum diagram of a communication signal as an example, which is as shown in FIG. 2, a detail drawing and rendering process is performed as follows.

The spectrum diagram of a communication signal contains four graphic elements: a real-time signal frequency, a signal frequency control line, a graphic background, and real-time coordinates.

With the above method, scene change rates of all graphic elements in an application region are acquired. The graphic elements in the graphic are grouped to different graphic layers based on the scene change rates. The real-time signal frequency and the signal frequency control line which have high scene change rates are grouped to different graphic layers, and the real-time coordinates and the graphic background which have low scene change rates are grouped to other graphic layers.

Signal data is inputted in real time. The signal data is transmitted to a "real-time signal frequency" layer and a "signal frequency control line" layer in real time. It is unnecessary to input, in real time, coordinates of a mouse outside the graphic to a "real-time coordinates" layer in which changes are unnecessary to be drawn in real time. The "background" layer does not change, and it is unnecessary to dynamically transmit data to the "background" layer and draw and render the "background" layer in real time. Therefore, the graphic layers are processed in a layered manner.

According to the embodiments of the present disclosure, display graphic layers are established based on the acquired change rates of graphic elements, the entire graphic is processed in a layered manner. The graphic layers are drawn and rendered separately according to requirements for different graphics, thereby solving the problem in the conventional technology that the graphic drawing and rendering method is performed mainly relying on the hardware of terminal devices. By processing the graphic in a layered manner, a limited computing resources of the computer are allocated to graphic layers including graphic elements with high change rates, so that the waste of the computing resources can be avoided, and the graphics drawing and rendering method can be performed efficiently. The technical solutions of the present disclosure are applicable to the fields of large-scale geographic graphics drawing, dynamic communication signal maps drawing, dynamic map condition changing, real-time data monitoring, and the like.

Figure 3:
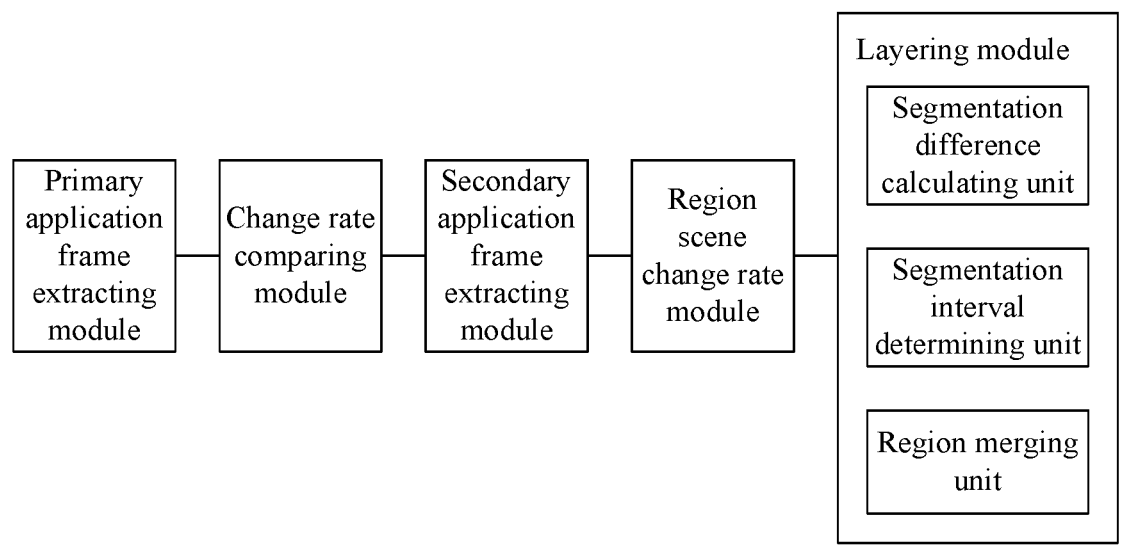
FIG. 3 is a block diagram showing a structure of a system for drawing and rendering a graphic in real-time in a layered manner according to an embodiment of the present disclosure.

As shown in FIG. 3, a system for drawing and rendering a graphic in real-time in a layered manner is further provided according to an embodiment of the present disclosure. The system includes: a primary application frame extracting module, a scene change rate comparing module, a secondary application frame extracting module, a region scene change rate module, and a layering module.

The primary application frame extracting module is configured to extract adjacent application frames spaced with a time period, calculate a scene change rate, and determine whether the scene change rate exceeds a preset change rate threshold.

The scene change rate comparing module is configured to group, if the scene change rate does not exceed the preset change rate threshold, all graphic elements to a same graphic layer, and perform step S3 if the scene change rate exceeds the preset change rate threshold.

The secondary application frame extracting module is configured to extract M application frames chronologically located between the adjacent application frames.

The region scene change rate module is configured to divide each of all the extracted application frames into N regions, and calculate a scene change rate of adjacent application frames for each of the N regions.

The layering module is configured to calculate an average scene change rate for each of the N regions, perform a layering operation based on the average scene change rate, and draw and render each of graphic layers separately.

The average scene change rate for each of the N regions is calculated according to the following expression:

$$S_{average} = \frac{\sum_{j}^{M} S_j}{M-1}, j = 1, 2, \ldots, M$$

where $S_{average}$ represents the average scene change rate, and $S_j$ represents a scene change rate of a (j+1)-th application frame relative to a j-th application frame.

The layering module includes a segmentation difference calculating unit, a segmentation interval determining unit, and a region merging unit.

The segmentation difference calculation unit is configured to acquire a maximum average scene change rate $S_{max}$ and a minimum average scene change rate $S_{min}$, and calculate a segmentation difference according to an expression of $$\frac{S_{max} - S_{min}}{N}.$$

The segmentation interval determining unit is configured to determine a segmentation interval for the average scene change rate based on the segmentation difference, that is:

$$\left\{ S_{min}, S_{min} + \frac{S_{max} - S_{min}}{N} * 1, \right.$$
$$\left. S_{min} + \frac{S_{max} - S_{min}}{N} * 2, \ldots, S_{min} + \frac{S_{max} - S_{min}}{N} * i, i = N \right\}$$

The region merging unit is configured to merge regions with average scene change rates that are within a same interval, and group the regions with average scene change rates that are within the same interval to a same graphic layer, to perform the layering operation.

The N regions have a same area.

The above description only shows preferred embodiments of the present disclosure and is not intended to limit the present disclosure. Any modification, equivalent replacement and improvement made within the spirit and principle of the present disclosure should fall within the protection scope of the present disclosure.

The invention claimed is:

1. A method for drawing and rendering a graphic in real-time in a layered manner, comprising:
    step S101, extracting adjacent application frames spaced with a time period, calculating a scene change rate, and determining whether the scene change rate exceeds a preset change rate threshold;
    step S102, grouping, if the scene change rate does not exceed the preset change rate threshold, all graphic elements to a same graphic layer; and performing step S103 if the scene change rate exceeds the preset change rate threshold;
    step S103, extracting M application frames chronologically located between the adjacent application frames;
    step S104, dividing each of all the extracted application frames into N regions, and calculating a scene change rate of adjacent application frames for each of the N regions; and
    step S105, calculating an average scene change rate for each of the N regions, performing a layering operation based on the average scene change rate, and drawing and rendering each of graphic layers separately.

2. The method for drawing and rendering a graphic in real-time in a layered manner according to claim 1, wherein the performing a layering operation based on the average scene change rate comprises:
    step S201, acquiring a maximum average scene change rate $S_{max}$ and a minimum average scene change rate $S_{min}$, and calculating a segmentation difference according to an expression of $$\frac{S_{max} - S_{min}}{N};$$

step S202, determining a segmentation interval for the average scene change rate based on the segmentation difference, that is:

$$\left\{ S_{min}, S_{min} + \frac{S_{max} - S_{min}}{N} * 1, S_{min} + \frac{S_{max} - S_{min}}{N} * 2, \ldots, S_{min} + \frac{S_{max} - S_{min}}{N} * i, i = N \right\}$$

step S203, merging regions with average scene change rates that are within a same interval, and arranging the regions with average scene change rates that are within the same interval to a same graphic layer, to perform the layering operation.

3. The method for drawing and rendering a graphic in real-time in a layered manner according to claim 2, wherein the N regions have a same area.

4. The method for drawing and rendering a graphic in real-time in a layered manner according to claim 1, wherein the average scene change rate for each of the N regions is calculated according to the following expression:

$$S_{average} = \frac{\sum_{j}^{M} S_j}{M-1}, j = 1, 2, \ldots, M$$

where $S_{average}$ represents the average scene change rate, and $S_j$ represents a scene change rate of a (j+1)-th application frame relative to a j-th application frame.

5. The method for drawing and rendering a graphic in real-time in a layered manner according to claim 4, wherein the N regions have a same area.

6. The method for drawing and rendering a graphic in real-time in a layered manner according to claim 1, wherein the N regions have a same area.

7. A system for drawing and rendering a graphic in real-time in a layered manner, comprising:
    a primary application frame extracting module configured to extract adjacent application frames spaced with a time period, calculate a scene change rate, and determine whether the scene change rate exceeds a preset change rate threshold;
    a change rate comparing module configured to group, if the scene change rate does not exceed the preset change rate threshold, all graphic elements to a same graphic layer;
    a secondary application frame extracting module configured to extract, if the scene change rate exceeds the preset change rate threshold, M application frames chronologically located between the adjacent application frames;
    a region scene change rate module configured to divide each of all the extracted application frames into N regions, and calculate a scene change rate of adjacent application frames for each of the N regions; and
    a layering module configured to calculate an average scene change rate for each of the N regions, perform a layering operation based on the average scene change rate, and draw and render each of graphic layers separately.

8. The system for drawing and rendering a graphic in real-time in a layered manner according to claim 7, wherein the layering module comprises:
    a segmentation difference calculating unit configured to acquire a maximum average scene change rate $S_{max}$ and a minimum average scene change rate $S_{min}$, and calculate a segmentation difference according to an expression of $$\frac{S_{max} - S_{min}}{N};$$

a segmentation interval determining unit configured to determine a segmentation interval for the average scene change rate based on the segmentation difference, that is:

$$\left\{ S_{min}, S_{min} + \frac{S_{max} - S_{min}}{N} * 1, S_{min} + \frac{S_{max} - S_{min}}{N} * 2, \ldots, S_{min} + \frac{S_{max} - S_{min}}{N} * i, i = N \right\}$$

a region merging unit configured to merge regions with average scene change rates that are within a same interval, and arranging the regions with average scene change rates that are within the same interval to a same graphic layer, to perform the layering operation.

9. The system for drawing and rendering a graphic in real-time in a layered manner according to claim 8, wherein the N regions have a same area.

10. The system for drawing and rendering a graphic in real-time in a layered manner according to claim 7, wherein the average scene change rate for each of the N regions is calculated according to the following expression:

$$S_{average} = \frac{\sum_{j}^{M} S_j}{M-1}, j = 1, 2, \ldots, M$$

where $S_{average}$ represents the average scene change rate, and $S_j$ represents a scene change rate of a (j+1)-th application frame relative to a j-th application frame.

11. The system for drawing and rendering a graphic in real-time in a layered manner according to claim 10, wherein the N regions have a same area.

12. The system for drawing and rendering a graphic in real-time in a layered manner claim 7, wherein the N regions have a same area.

* * * * *